United States Patent [19]
Kasha

[11] Patent Number: 4,734,036
[45] Date of Patent: Mar. 29, 1988

[54] METHOD AND DEVICE FOR LEARNING A LANGUAGE

[76] Inventor: Helene Kasha, P.O. Box 5564, Hamden, Conn. 06518

[21] Appl. No.: 929,198
[22] PCT Filed: Nov. 26, 1985
[86] PCT No.: PCT/US85/02347
§ 371 Date: Jul. 30, 1986
§ 102(e) Date: Jul. 30, 1986
[87] PCT Pub. No.: WO86/03321
PCT Pub. Date: Jun. 5, 1986

Related U.S. Application Data

[63] Continuation-in-part of Ser. No. 676,824, Nov. 30, 1984, abandoned.

[51] Int. Cl.$^4$ .............................................. G09B 19/08
[52] U.S. Cl. ...................................... 434/157; 281/42; 281/45; 283/46
[58] Field of Search ............... 434/157, 170, 347, 348, 434/349, 163, 156; 283/46, 63 R; 281/42, 45; 24/67.9

[56] References Cited

U.S. PATENT DOCUMENTS

| | | | |
|---|---|---|---|
| 2,950,544 | 8/1960 | Leighton | 434/157 |
| 3,052,043 | 9/1962 | Pimental | 434/157 |
| 3,081,560 | 3/1963 | Campo Agud | 434/157 |
| 3,271,884 | 9/1966 | Roberson | 434/157 |
| 3,435,542 | 4/1969 | Barouh | 434/157 |
| 3,724,102 | 4/1973 | Van Patten | 434/157 |
| 3,744,155 | 7/1973 | Demonet | 434/157 |
| 3,871,115 | 3/1975 | Glass et al. | 434/157 |
| 4,177,578 | 12/1979 | Yamamoto | 434/157 |
| 4,345,902 | 8/1982 | Hengel | 434/170 |
| 4,604,063 | 8/1986 | Gurmarnik | 434/157 |

FOREIGN PATENT DOCUMENTS

| | | | |
|---|---|---|---|
| 14164 | 9/1933 | Australia | 424/67.9 |
| 169289 | 10/1951 | Austria | 434/348 |
| 2022166 | 12/1971 | Fed. Rep. of Germany | 283/63 R |
| 1456927 | 9/1966 | France | 24/67.9 |
| 255442 | 1/1949 | Switzerland | 434/348 |

OTHER PUBLICATIONS

Games Magazine, Sep./Oct. 1981, pp. 45 and 79, Crossword Puzzle and Solution.

*Primary Examiner*—William H. Grieb
*Attorney, Agent, or Firm*—Kenyon & Kenyon

[57] ABSTRACT

A teaching aid for reinforcing a student's ability to learn an unfamiliar language includes an upper sheet (12) marked with symbolic indicia to be taught to the student and one or more base sheets (11), each marked with a different translated version of the indicia on the upper sheet. The indicia on each base sheet are marked in registry with the corresponding indicia on the upper sheet. One edge of the base sheet is joined, temporarily or permanently, to a corresponding edge of the upper sheet to allow the upper sheet to be lifted up from the base sheet to briefly expose a corresponding translation, transliteration, interpretation, or paraphrase marked on the base sheet then lowered again so that reading of the upper sheet can be instantly resumed. The upper sheet and the base sheet may be parts of a single sheet having a fold line at the joined edges. The upper and base sheets may be joined at any corresponding edges, but the top edges are preferred for sheets having lengths greater than their widths. The teaching aid is used by reading the text on the upper sheet and by rapidly raising and lowering, or scrolling, the upper sheet to briefly check the corresponding text on the base sheet when necessary.

31 Claims, 14 Drawing Figures

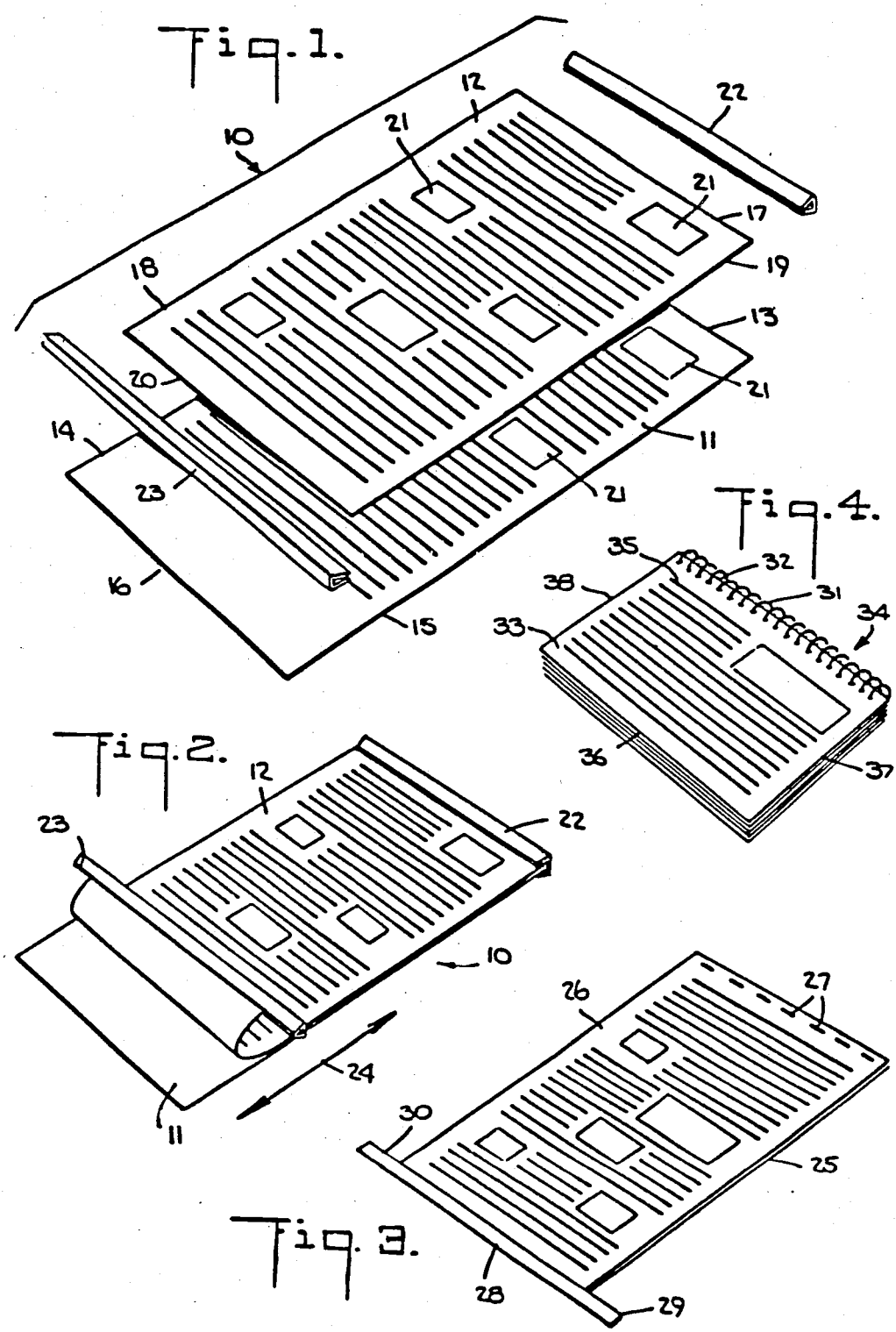

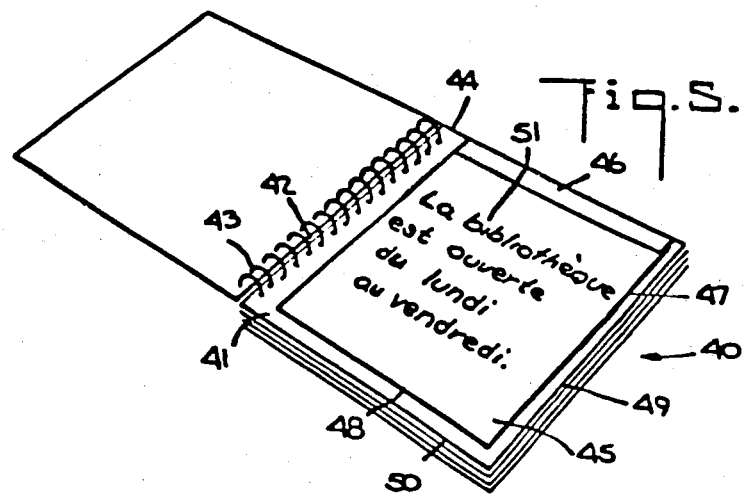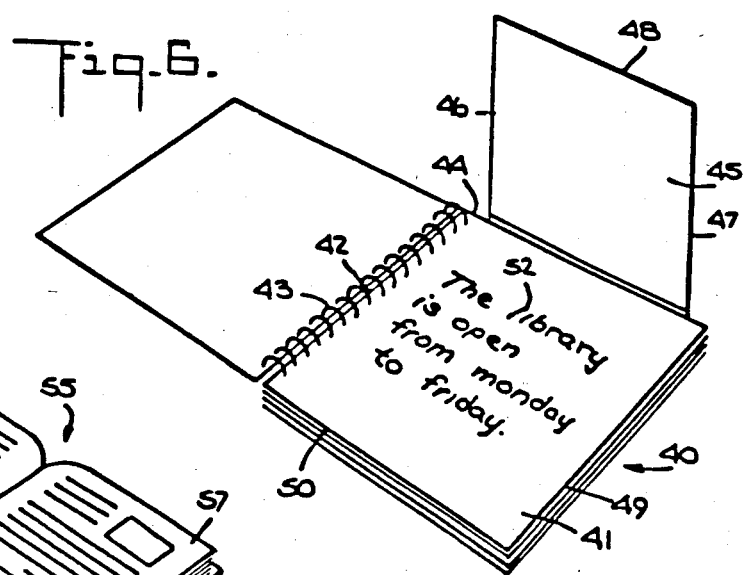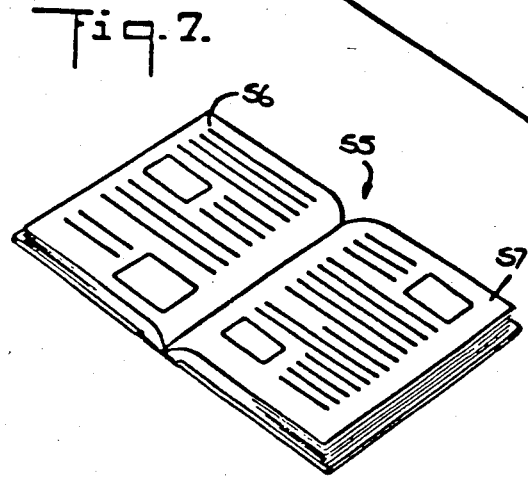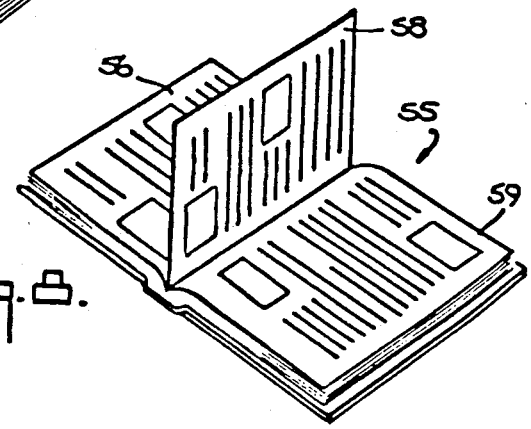

METHOD AND DEVICE FOR LEARNING A LANGUAGE

CROSS-REFERENCE TO RELATED APPLICATIONS

This is a continuation-in-part (via bridging PCT International Application PCT/US85/02347 filed Nov. 26, 1985) of U.S. patent application Ser. No. 06/676,824 filed Nov. 30, 1984 and now abandoned.

TECHNICAL FIELD

The present invention relates to a method and device for learning the meaning of symbolic indicia (e.g., words of a foreign language), and it particularly relates to a learning aid containing corresponding sets of indicia, one translating, transliterating, interpreting, or paraphrasing the other, and to a method for using the learning aid.

BACKGROUND INFORMATION

In teaching a foreign language, and particularly for building a vocabulary, it is a common practice to use learning aids that match words or phrases in the foreign language with their counterparts in a student's native language. Most often used are simple cards having the foreign word or phrase written on one side and its translation written on the other side. It is also common to use parallel lists, either on a single sheet or on separate sheets. The list in the known language is usually covered while the words in the foreign language are studied. When unsure of the meaning of a word in the foreign language list, the student will briefly uncover the adjacent list in the known language to compare the foreign word with the known word.

For more advanced students, the parallel list concept has been expanded to complete books, in which the text is printed in one language in alternate columns or on alternate pages, for example on the even-numbered pages, and a translation of this text is printed in adjacent columns or on the alternate facing pages, for example on the odd-numbered pages. The translated text is positioned substantially opposite to the text in the first language, so that the counterpart words and phrases can be found by looking across from one column to the adjacent column or from one page to the opposite facing page.

Whether used for lists of characters, discrete words and phrases or for continuous coherent text, such as a story, the side by side arrangement described above requires the reader to shift focus laterally from one column or page to an adjacent column or page to check the meaning of words he does not know or has forgotten. The shifting of visual attention is a distraction, particularly when reading coherent text, so that much of the potential reinforcement to be obtained from the use of a duplicate text format is unrealized when using the side by side arrangement.

When presented with the side-by-side translation, the student will, after trying to comprehend the foreign-language text, inevitably come to rest his eyes on the version he is most familiar with, i.e., the translation. The side-by-side layout distracts the student from his initial intent which is to comprehend or study the foreign-language text.

DISCLOSURE OF THE INVENTION

It is a principal object of the present invention to provide a learning aid comprising corresponding texts, one translating, transliterating, or paraphrasing the other, and a method of using the learning aid that takes advantage of persistence of vision to achieve better comprehension and quicker leaning than is possible with prior art learning aids, and with minimum visual effort and clutter, thereby permitting the reader to concentrate on the learning process.

This and other objects are obtained by means of a teaching aid for reinforcing a student's ability to learn the meaning of symbolic indicia. The teaching aid comprises:

a flexible upper sheet having a peripheral edge, having legible symbolic indicia marked thereon in a predetermined format;

a base sheet having marked thereon corresponding legible symbolic indicia comprising a translation of the symbolic indicia marked on the upper sheet and in substantially exact registry with the corresponding indicia on the upper sheet; and means for joining a portion of the edge of the upper sheet to a corresponding portion of the edge of the base sheet so that the indicia on the upper sheet are superposed above the corresponding indicia on the base sheet, whereby lifting the upper sheet away from the base sheet will reveal the translation marked on the base sheet, with corresponding indicia of the upper and base sheets in substantially the same position.

The means for joining a portion of the edge of the top sheet to the corresponding portion of the edge of the base sheet preferably comprises a temporary binding means such as an elongated channel-shaped plastic binding clamp removably attached to corresponding straight edges of the two sheets. Although for most applications the sheets are preferably attached along a top portion of the edge of each sheet, the sheets may be attached on any corresponding edge portions when it is desireable to do so because of either the shape of the sheets, the arrangement of indicia upon the sheets, or other reasons. A temporary binding means permits a student to reverse the order of the sheets for self testing. Alternatively, single or multiple pairs of sheets can be permanently or semi-permanently bound by staples, spiral wires, ring binders, or the like.

The teaching aid may further include means to facilitate lifting the upper sheet, this means extending outwardly from the edge of the upper sheet at a location spaced from the attached portion. For example, a stiff rodlike member can be attached along a straight edge of a rectangular upper sheet opposite to an edge portion joined to the base sheet, the rod having opposite ends extending outwardly beyond adjacent side edges of the upper sheet. This rod-like member can conveniently be another channel-shaped plastic binding clamp like the clamp used to join the edge portion of the two sheets.

The teaching aid may further comprise a plurality of superposed base sheets marked with different sets of corresponding indicia such that the student will have readily available any predetermined combination of translations, transliterations, interpretations, descriptions and sheets or removable flaps for written exercises. The plurality of base sheets also are arranged so that the indicia on each sheet are in substantial registry with the corresponding indicia on the upper sheet which they translate, transliterate, interpret or describe, so that the student will not have to move his eyes or change his focus.

The teaching aid may also include means which provide space for written exercises in the form of a blank sheet or removable adhesive opaque flap covering a certain text portion or character. The student tries to fill in the missing portion of text or character from memory. When unsure of the correct answer, he can lift the flap for a split second and glance at the text to refresh his memory, then let it fall back in order to fill in the correct answer. The flaps must be opaque so as to prevent tracing which is done without appying thought and does not contribute to the learning process. The opaque flap can be reused on another text portion if the hand-written entries can be erased. For this purpose, a slate-like or plasticized surface material of the flap is recommended.

The teaching aid with a plurality of base sheets may further include means to facilitate the lifting of each sheet above the lowermost base sheet, this means extending outwardly from the edge of the respective base sheet. This means can conveniently be plastic tabs which either adhere or clip to the edge of the sheet to which they are attached. The plastic tabs may further contain a word, words, or marking which identifies the type of indicia which are marked upon the sheet placed immediately below the sheet to which the tab is attached. These tabs are preferably offset so that with the teaching aid laid face up upon a flat surface all of the plastic tabs and their markings will be legible and visible to the student.

The invention also includes a method for using the learning aid described above, the method comprising rapidly lifting the upper sheet while focusing on specific indicia thereon to expose the corresponding indicia on the base sheet whenever the reader desires to refresh his understanding of the meaning of the indicia.

Preferably, the upper sheet and the base sheet are rectangular and are joined at their top edges, and the bottom edge of the upper sheet is rapidly lifted and lowered while keeping the eyes focused on a specific portion of the assembly to view alternately the indicia on the upper sheet and the corresponding indicia on the base sheet. The same method can be used as a self test when the upper sheet carries familiar indicia and the base sheet is imprinted with the corresponding indicia being learned.

If the sheets are bound at the top and the length of the upper sheet is substantially greater than the width, a preferred method of lifting and lowering the upper sheet is to curl the bottom edge of the upper sheet upward and toward the top edge and then to translate the bottom edge of the upper sheet parallel to itself and to the plane of the base sheet in a reciprocating to-and-fro scrolling motion. Since the two sets of indicia are substantially in registry, the indicia on the upper sheet will tend to merge with the corresponding indicia on the base sheet due to the persistance of vision.

The result is a unique learning experience that appears to significantly improve a student's comprehension of the materials being studied.

The above and other objects and features of the invention will become more clearly apparent from the following description of the preferred embodiments, taken in conjunction with the attached drawings.

BRIEF DESCRIPTION OF THE DRAWINGS

FIG. 1 is a perspective exploded view of a teaching aid according to the invention.

FIG. 2 is a perspective view of the assembled teaching aid of FIG. 1 showing a method of scrolling the top sheet.

FIG. 3 is a perspective view of an alternative embodiment of a teaching aid according to the invention.

FIG. 4 is a perspective view of another alternative embodiment of a teaching aid according to the invention, in which a plurality of successive upper and base sheets are spiral bound along their top edges.

FIG. 5 is a perspective view of still another embodiment of a teaching aid according to the invention in the form of a spiral bound book having individual pages consisting of an upper sheet folded over a base sheet.

FIG. 6 is a perspective view of the embodiment of FIG. 5 showing an upper sheet raised to reveal corresponding text on the base sheet.

FIG. 7 is a perspective view of still another embodiment of a teaching aid according to the invention in the form of a permanently bound book.

FIG. 8 is a perspective view of the embodiment of FIG. 7 showing a page lifted to reveal the corresponding texts on alternate following and preceding pages.

BEST MODE FOR CARRYING OUT THE INVENTION

Figure 9:
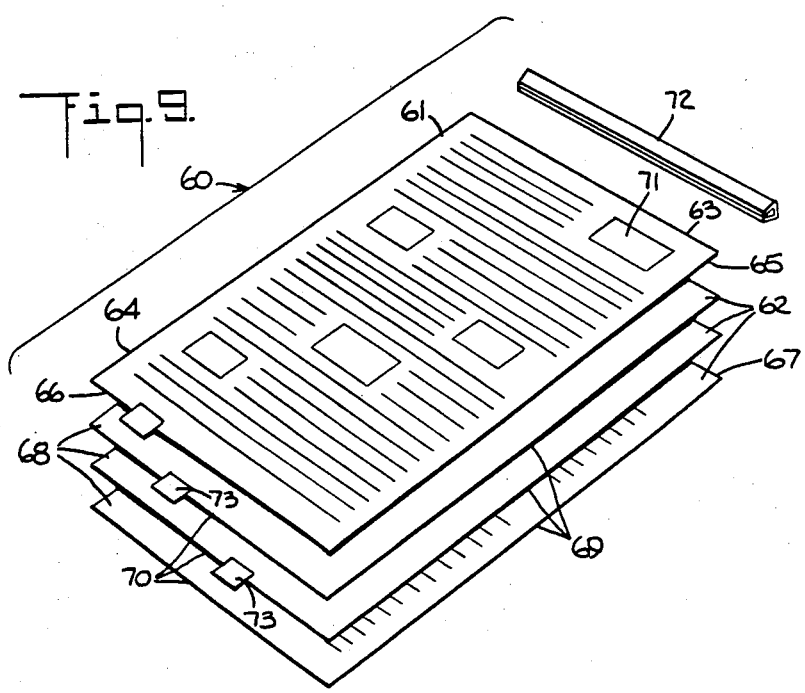
FIG. 9 is a perspective exploded view of an alternate embodiment of a teaching aid according to the invention.

With reference to FIG. 1, a teaching aid 10 for assisting a student to learn the meaning of predetermined sets of indicia as shown with the four elements of the aid disassembled. These elements include a base sheet 11 and a flexible upper sheet 12. The base sheet 11 has a top edge 13, opposite side edges 14 and 15, and a bottom edge 16. The top sheet similarly has a top edge 17, two opposite side edges 18 and 19, and a bottom edge 20.

The upper sheet 12 has a predetermined format of indicia, for example a text of an unfamiliar language being taught to the student, printed or otherwise marked thereon. This text may be in continuous coherent form, or it may be in the form of discrete words, phrases, or characters.

The base sheet 11 has indicia, which are substantially equivalent in meaning to those on the upper sheet, marked thereon and arranged in the same format as the indicia marked on the upper sheet. The text on the base sheet should be as nearly in registry with the corresponding text on the upper sheet as is possible within the constraints of differences in syntax, grammer, direction of reading and length between the text marked on the upper sheet and the text marked on the base sheet. Although the text marked on the upper sheet typically will be in a language being taught to the student, the order of the sheets can be reversed if the student desires to self test his or her ability to translate the familiar text into the unfamiliar language.

Usually the upper sheet and base sheet will be the same size and shape, but this is not essential. In some cases it will be desirable to have the two sheets of different sizes, as will be explained in more detail below. Also, the proportion between length and width of the sheets may vary, as desired and depending on the format of the textual material. The important requirement is that the text on the base sheet be substantially in registry with the text on the upper sheet. Furthermore, it is a matter of convenience as to which edge of each sheet is joined to the other. It has been found, however, that for most configurations it is preferred to join the upper and base sheets at their top edges, particularly if the sheets are relatively large.

If possible it is desirable to include nontextual elements on each sheets, such as pictorial elements 21. These nontextual elements should be identical on each sheet and should be located in exact registry on the two sheets.

It may be desirable also to color code the materials, particularly if it is not possible to arrange the materials on one sheet in exact registry with those on the other, so that the student can easily match the corresponding words or phrases, and so that the interruption to his concentration is minimal. This color coding can be accomplished by printing or marking the words or phrases on one sheet in the same color as the corresponding words or phrases on the other sheet, but each word or phrase should be printed in a color different from the colors used to print or mark the words or phrases surrounding the particular word or phrase. An alternative embodiment is to underline the words or phrases on one sheet using the same color as the color used to underline the corresponding words or phrases on the other sheet, but each word or phrase should be underlined using a color different from the colors used to underline the words or phrases surrounding the particular character, word or phrase.

A further embodiment of color coding is to superpose several identical versions of a text containing symbolic indicia, where the first base sheet shows certain parts of speech, e.g., all verbs appearing on the sheet, outlined in one color. The second base sheet shows other parts of speech, e.g., all pronouns appearing in the sheet, outlined in another color, and so on. Teaching syntactical or grammatical structures using this form or color separation is conducive to study, for it does not clutter the field of view of the student.

A means such as a plastic binder clamp 22 is provided for joining the top edges 13 and 17 of the base and upper sheets, respectively. In addition, a similar plastic binder clamp 23, having a length greater than the length of the bottom edge 20 of the upper sheet, also may be provided as a means to facilitate lifting the upper sheet away from the base sheet.

FIG. 2 shows the components of the learning aid of FIG. 1 in assembled condition. The plastic binder clamp 22, which is a commercially available item, is channel shaped, with the sides of the channel angled inward so that their free edges abut each other. The base sheet and the upper sheet are assembled together by aligning the top edges of the two sheets and sliding the binder clamp 22 onto both top edges. In the same manner the binding clamp 23 is slid onto the bottom edge of the upper sheet only and is centered so that its opposite ends extend beyond the opposite side edges of the upper sheet.

To use the assembled teaching aid, a student will place the two sheets on a flat surface, such as a table, at a convenient position for reading the text on the upper sheet. If the student comes to a word or a phrase about which he is uncertain, he will grasp the opposite ends of the member 23 between the thumb and forefinger of each hand. He will then rapidly raise the upper sheet away from the base sheet while keeping his eyes focused on the portion of the text that he does not know. The upper sheet is briefly raised to expose the corresponding portion of the text on the base sheet, and then it is lowered again. This procedure may be repeated rapidly several times. Due to the persistence of vision, the words in the unfamiliar language of the upper sheet will appear to merge with the corresponding words in the familiar language on the base sheet. This apparent merging not only informs the student of the meaning of the foreign language word or phrase, but also apparently conveys this merged visual impression to the student's memory so that the two words or phrases apparently become linked together in his mind.

As indicated in FIG. 2, a convenient method for raising and lowering the upper sheet, particularly if its length is greater than its width, is to turn the member 23 between the fingers so that the bottom edge of the uper sheet tends to curl up and over toward the top edge. After the bottom edge has been curled over, the member 23 is reciprocatingly translated in a direction perpendicular to its length and parallel to the base sheet as shown by the double ended arrow 14. This movement causes the upper sheet to scroll up and down over the base sheet. With a little practice this scrolling movement is accomplished very easily and with minimum disturbance to the student's concentration on reading the text.

FIG. 3 shows an alternative embodiment of the learning aid in which a base sheet 25 and an upper sheet 26 are joined at their respective top edges by a row of staples 27. Means are provided for lifting the bottom edge of the top sheet away from the base sheet. These means are in the form of a stiff elongated member 28, which can be made of cardboard, wood, plastic, or any other suitable material. The member 28 can be fastened to the bottom edge of the upper sheet by any suitable means, such as glue or staples. The length of member 28 is greater than the length of the bottom edge of the upper sheet so that end portions 29 and 30 extend beyond the side edges of the upper sheet. The mode of operation of the embodiment of FIG. 3 is the same as described above for FIG. 2.

FIG. 4 shows an alternative arrangement that is particularly suitable for permanently binding a large number of successive upper and base sheet pairs by means of a conventional spiral binding 31 joining the top edges 32 of pages 33 to form a book 34. In this embodiment the text format 35 results in sheets having longer top and bottom edges 32, 36 than side edges 37, 38.

In its simplest form, the invention can be embodied in a single sheet folded in half, one half of the single sheet being marked with text in a first language and the other half of the single sheet being marked on the other side thereof with a corresponding text in a second language and the two texts being congruent when the single sheet is folded. This simplest embodiment has the additional advantage that folding the sheet in one way will present the second language text superposed on the first language text, while reversing the fold will present the first language text superposed on the second language text.

FIGS. 5 and 6 show an alternative book style embodiment 40 in which the individual pages comprise base sheets 41 having left side 42 that are bound together by a spiral binding 43. To the top edge 44 of each base sheet is joined the corresponding top edge of an upper sheet 45. The joining means may be strip of adhesive tape 46, or the upper and lower sheets may be formed from a single sheet that is folded along the top edge 44.

The width of each upper sheet 45 is less than the width of its base sheet 41 so that the left edge 46 of each upper sheet does not touch the spiral binding when the upper sheet is folded down over the base sheet, as shown in FIG. 5. Also in this embodiment, the right side edge 47 and the bottom edge 48 of the upper sheet 45 are within the respective margins of the right side edge 49 and the bottom edge 50 of the base sheet 41. That is, the width and length dimensions of the upper sheets are smaller than the corresponding dimensions of the base sheet. This difference in size makes it easy to separate the lower right corner of the upper sheet from the base sheet, so that the upper sheet can be lifted away from the base sheet, as shown in FIG. 6, without the need for any additional means, such as the stiff members 23 and 29 shown in the embodiments of FIGS. 1 and 3, respectively.

If desired, however, the right and bottom edges of the upper sheet can be made congruent with the corresponding edges of the base sheet. For ease of handling during printing, the upper and base sheets may start initially as a single rectangular double-length sheet. After being printed on the lower half of one side with the desired text in one language and on the half of the opposite end of the reverse side with the corresponding text in the other language, the initial sheet can be then folded in half to form an upper sheet printed in the one language superposed over a base sheet printed in the other language. The upper sheet can be trimmed to smaller dimensions before folding, or the sheet can be left untrimemd and a left margin piece attached to the left edge of the base sheet for receiving the spiral binding.

FIGS. 5 and 6 also illustrate, by a simple example, the manner in which a French text 51 is imprinted on the upper sheet 45 so as to be in registry with an English translation 52 imprinted on the base sheet. In this example, the English translation is word for word, with each word of the translation being positioned immediately underneath the corresponding word of the French text when the two sheets are superposed. In some learning situations, particularly with more advanced students, a more colloquial translation may be used, so that the words do not identically correspond in meaning and location. Even in such situations it has been found that the method of the present invention provides significant learning enhancement. In fact, the persistence of vision effect can be used to comprheend and memorize equivalent phrases and expressions as well as single characters or words.

With reference to FIGS. 7 and 8, the application of the present invention to a standard book format, for example a novel or other work of literature, is illustrated.

FIG. 7 shows a book opened to reveal a left-hand page 56 printed in one language and a right-hand page 57 printed in another language. As is apparent from the placement of illustrations and text, the material imprinted on the left-hand page 56 does not correspond to the material imprinted on the right-hand page 57.

FIG. 8 shows the same book 55 with the sheet bearing the right-hand page 57 lifted up to show a following left-hand page 58 and a right-hand page 59. A comparison of FIGS. 7 and 8 makes it clear that the text on left-hand page 58 corresponds in format to the text on left-hand page 56, whereas the text on right-hand page 59 corresponds in format to the text on right-hand page 57. Pages 56 and 59 are imprinted in a first language, and pages 57 and 58 are imprinted in a second language. Thus page 59 is a base sheet and page 57 is a corresponding upper sheet, while page 58 is an upper sheet, the text of which follows the text of page 57, and page 56 is its corresponding base sheet.

The first language will normally be the native language of a student, and the second language will be one that the student is learning. To read the book 55 in the second language, the student will read a right-hand page and then the following left-hand page, for example, pages numbered 1 and 2, in each case lifting the sheet as necessary to check the corresponding translated text on the sheet beneath the sheet he is reading. After finishing the left-hand page (e.g., page number 2) the student will then turn the following sheet and start reading the subsequent right hand page (e.g., page number 5) and continue to the next left-hand page (e.g., page number 6). By skipping alternate sheets, which are printed in the first language, the student will be able to read continuous text in the second language while always being able to check the meaning by lifting the page that he or she is reading to see the in-registry corresponding text in the first language.

The foregoing discussion of the invention has focused on its use to compare corresponding texts in an unfamiliar language and a native language. The inventive concept has much broader application, however, since it basically provides a method and a means for learning or reinforcing the relation between two or more superposed sets of corresponding markings or indicia. For example, the invention can be used:

to teach the upper and lower cases of an alphabet by providing both upper and lower case versions of a prepared text on the two sheets respectively;

to teach the proper pronunciation of a language by providing a phonetization of the upper sheet of text upon the base sheet;

to teach the printed and script versions of an alphabet by providing both printed and script versions of a prepared text on the two sheets respectively;

to teach unfamiliar alphabets (e.g, Cyrillic or Greek) or characters (Chinese ideograms, Japanese syllabaries, etc.) by providing an identical text in a familiar alphabet (e.g., Roman);

to teach the unvocalized version of a language which is written without vowel signs in ordinary usage (e.g., Hebrew, Arabic, or Farsee) by providing a text without vowel signs on one sheet and the corresponding text with vowel signs on the other;

to provide the student with information and greater detail by providing a base sheet containing footnotes which may include grammar, syntax, etymology, historical references or general references;

to faciliatte the student's comprehension of linguistically difficult native-language texts, e.g., pre-modern English or elliptical writings, by providing an easy-to-read version; in this manner, the clarifying version is discretely tucked under the principal text, the latter appearing clear and clutter-free on the top layer; and to provide space for written exercises by means of a separate sheet or adhesive opaque flap covering temporarily certain characters or portions of text; in this manner, the student can fill in the missing character or text portion.

Furthermore, a native or foreign language can be taught to young children by providing the language to be taught on the top sheet and pictures which illustrate the words or phrases to the student on the base sheet or vice versa.

With reference to FIG. 9, a multiple base sheet version of a teaching aid 60 is shown with the elements of the aid disassembled. These elements include a flexible uppermost sheet 61 and multiple base sheets 62. The uppermost sheet 61 has a top edge 63, opposite side edges 64 and 65, and a bottom edge 66. The multiple base sheets similarly have top edges 67, opposite side edges 68 and 69, and bottom edges 70.

As in the two-sheet teaching aid disclosed above, the uppermost sheet 61 and the base sheets 62 will usually be the same size and shape but, again, this is not essential. Each sheet can be of a different size or shape if this is desirable for a particular application of the invention. Any common edge of the sheets may be joined in order to make the teaching aid. Although for most configurations it is preferable to attach the sheets at their upper edge, there are applications in which it is preferable to attach the sheets on one side edge or the other, e.g., where a language which reads from right to left is being translated into a language which reads from left to right, or vice versa.

As before, the uppermost sheet 61 has a predetermined text either in continuous coherent form or in the form of discrete characters, words or phrases. Each of the several base sheets 62 has a different version of the text in substantial registry with the format of the upper sheet. The several base sheet versions can include translations, for example, into one or more languages, into a different alphabet, into different modes of the same alphabet (e.g., upper case, lower case, script), into a vocalized version of an unvocalized upper sheet text, into a phonetically spelled version, and so forth. The various versions on the several base sheets will each be defined generically as a "translation" of the text on the upper sheet, whether the version is a rendering in a different language, a transliteration into a different alphabet or other corresponding symbols, a paraphrase, an interpretation or explanation, or a footnote.

As mentioned before, it is desirable to include common nontextual elements on each sheet if possible, such as pictorial elements 71 or markings such as indentation, etc. These nontextual elements should be identical on each sheet and should be located in exact registry on the several sheets to provide landmarks for easy location of the desired indicia.

A means, such as a plastic binder clamp 72, is provided for joining the desired edges of the uppermost and base sheets. In addition, plastic tabs 73 may be provided to facilitate lifting the uppermost and any intermediate base sheets away from a desired base sheet beneath them. Each tab may be marked with a word or figure which identifies the translations, pictures or descriptions which are printed or otherwise marked on the sheet resting immediately below the sheet to which the individual tab is attached.

Figure 10:
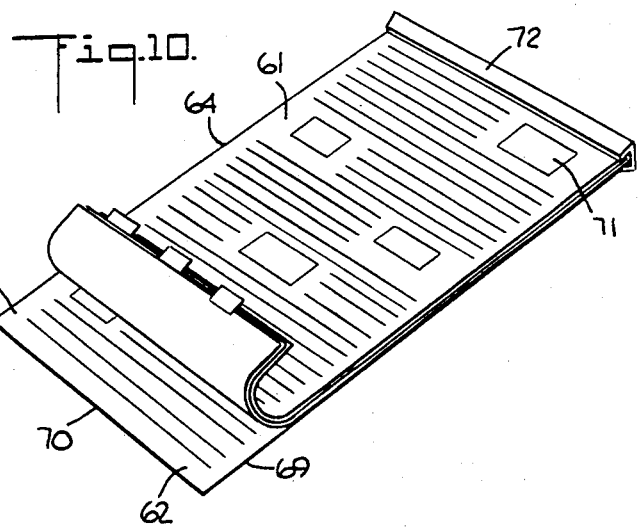
FIG. 10 is a perspective view of the assembled teaching aid of FIG. 9 showing a method of scrolling several sheets.

FIG. 10 shows the components of the learning aid of FIG. 9 in assembled condition. Each plastic tab is marked with a word, phrase or picture which identifies the explanations, translations, pictures or descriptions contained on the sheet which has been placed immediately below the sheet to which the plastic tab is attached. The tabs may be attached to the side edges, 64 and 68 or 65 and 69, or to the bottom edges 66 and 70.

To use the assembled teaching aid 60, a student will grasp the plastic tab corresponding to the particular type of translation he desires and will then rapidly raise the tabbed sheet and all sheets above it away from the sheet upon which the desired explanatory material is marked, while keeping his eyes focused on the portion of the text on the upper sheet that he wants clarified, just as with the two-sheet version previously explained. The intermediate base sheets above the lowermost sheet are flexible so that they can be rapidly raised and lowered.

As indicated above, the multiple base sheet embodiment of FIGS. 9 and 10 can be used in the same way as the single base sheet version, but the multiple sheet version provides the capability of having several different types of recognition reinforcement in a single teaching unit. For example, an upper sheet having a text in Hebrew script could be associated with a first base sheet having a corresponding unvocalized text in roman letters, a second base sheet having a transliterated vocalized text, a third base sheet having a word-for-word English translation, a fourth base sheet having an English paraphrase or interpretation and a fifth having the script form. Still another base sheet could have footnote or explanatory material keyed to certain words or phrases of the text on the upper sheet, by use of color underlining, letters, or background highlighting as previously described.

To acquire facility in a language, it is also important to complement reading comprehension with written exercises. Typically, a child when learning the alphabet, or a foreign language student, will copy the new symbols several times in a row. In China, for instance, it is common practice for children to copy a new symbol five hundred to a thousand times to memorize it.

Figure 11:
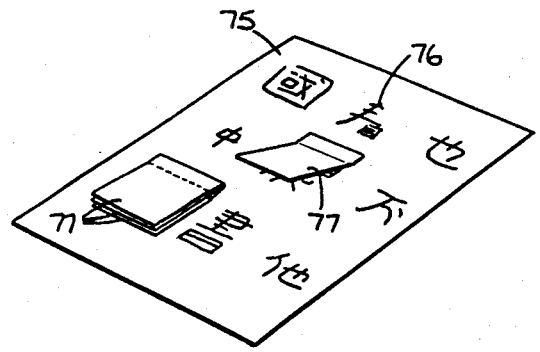
FIGS. 11 and 12 are perspective views of further embodiments of a teaching aid according to the invention which use adhesive fold-up tabs for practice in writing selected characters or groups of characters.

FIG. 11 illustrates an adaptation of the "lift and peek" technique for assisting the learning of alphabet symbols, or of ideographs in the case of Chinese or Japanese, for example. In this figure, a sheet 75 is marked with characters 76 to be learned. Lightly adhesive flaps 77 are positioned over selected symbols. The flaps 77 can have any size or shape, but they must be opaque. A flap may be placed partly or fully along an edge of the sheet 75 or anywhere on the page where there is a character or group of characters to be learned. The flap can be made of disposable paper, to be written on once and then discarded, or it can be made of more durable material, such as glossy card stock, that can be erased and reused many times.

Figure 12:
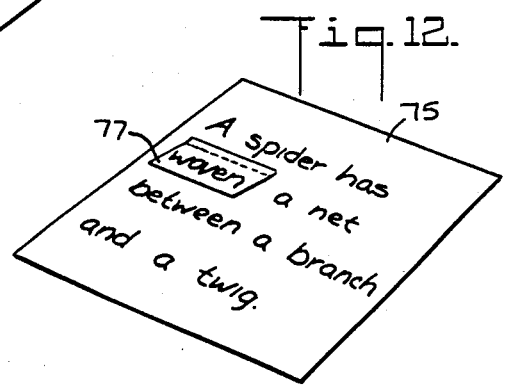

Each flap 77 has adhesive applied only to a marginal strip 78 that may be delimited from the rest of the flap by a score line 79. The score line facilitates lifting up the flap to catch a glimpse of the character or word covered by the flap. Because the opaque flap is placed over the character, the student cannot merely copy it, nor can the student trace the character because the tab is fully opaque. If desired, several disposable flaps 77 may be superposed, in the manner of a notepad, so that writing the character can be repeated for additional practice, each tab being lifted off and discarded after it has been written on. As shown in FIG. 12, these tabs are equally effective when used to cover a word or words of a written text.

Such flaps which hide a selected portion of the text, or a character, and which provide a surface for writing-in the hidden portion, allow rapid lifting to quickly reveal the symbol or text if the student is unsure of the shape of the character or the proper word sequence or spelling. They are most helpful for a student learning to write either individual characters or complete words. These flaps can be used either with a single sheet of text or with any of the multisheet arrangements described and illustrated above.

Figure 13:
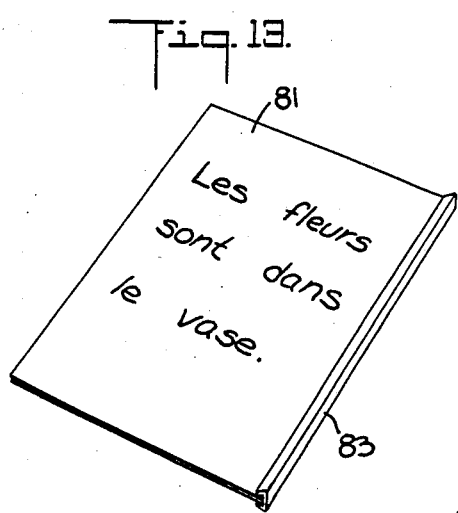
FIG. 13 is a perspective view of an alternative arrangement of a teaching aid according to the invention.
Figure 14:
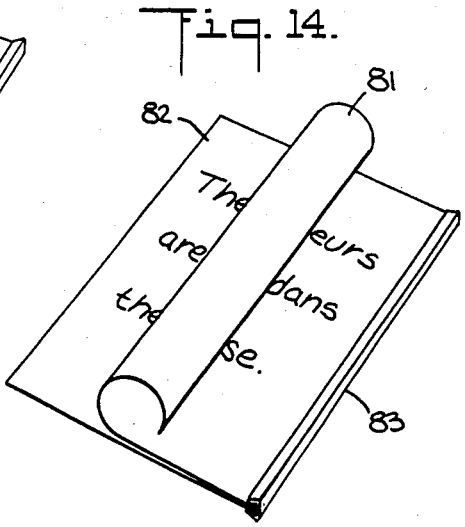
FIG. 14 is a perspective view of the embodiment of FIG. 13 showing a top sheet scrolled away from a base sheet.

In addition to the above embodiments, most of which are bound along the top edge of a sheet in which the text runs horizontally from left to right, it has been found that binding along the right side edges of such sheets is advantageous in many cases because the beginning of each line is exposed first when the top sheet is lifted. FIGS. 13 and 14 illustrate an arrangement of a top sheet 81 marked with text running in horizontal lines from left to right and a base sheet 82 marked in registry with a corresponding text in another language. The two sheets are bound on their right edges by a clip 83, allowing the left edge of the top sheet to be scrolled to the right to reveal the text on the base sheet, as shown in FIG. 14.

The foregoing embodiments are illustrative examples of the invention to give an indication of its scope and utility. It will be apparent to those of skill in the art that many other arrangements are possible without departing from the basic requirement of having an upper sheet marked with indicia in a predetermined format and at least one base sheet marked in registry with translating indicia, with one edge of one sheet being joined to a corresponding edge of the other sheet to permit lifting the upper sheet to view the text on the base sheet.

I claim:

1. A method for aiding a student to learn symbolic indicia, the method comprising:
   providing a first opaque sheet legibly marked with symbolic indicia in a predetermined format;
   providing a second opaque sheet marked with other symbolic indicia representing a translation of corresponding indicia on the first sheet, the other indicia on the second sheet being more familiar to the student than the indicia on the first sheet, and the indicia marked on the second sheet being in substantial registry with the corresponding indicia marked on the first sheet;
   joining corresponding edge portions of the two sheets together, one on top of the other to form an upper sheet and a base sheet contiguous to the upper sheet, such that the materials on the upper sheet are substantially in registry with the materials on the base sheet and so that the upper sheet can be lifted to expose momentarily all of the materials on the base sheet and then be lowered, so that reading of the upper sheet text can be immediately resumed;
   lifting the upper sheet rapidly while focusing on specific indicia thereon to briefly expose the corresponding indicia on the base sheet, such that the corresponding indicia on the base sheet are selectively viewed without changing the location of focus; and
   immediately lowering the upper sheet to resume study thereof.

2. A method according to claim 1 wherein the first sheet containing the indicia to be learned is the upper sheet and the second sheet containing the familiar indicia is the base sheet.

3. A method according to claim 1 wherein the first sheet containing the indicia to be learned is the base sheet and the second sheet containing the familiar indicia is the upper sheet.

4. A method according to claim 1 wherein the indicia on the first sheet represent at least one character in an unfamiliar language being taught to the student, and the indicia on the second sheet represent a translation of the at least one character of the unfamiliar language into a language familiar to the student.

5. A method according to claim 1 wherein said step of lifting the upper sheet rapidly comprises lifting and lowering an edge of the upper sheet opposite to the edge joined to the base sheet rapidly to expose alternately corresponding indicia on the base sheet and the upper sheet such that persistence of vision tends to merge the corresponding indicia on the first and second sheets.

6. A method according to claim 1 wherein the step of lifting the upper sheet comprises:
   curling said opposite edge of the upper sheet upward and toward said joined edge; and
   translating the curled opposite edge of the upper sheet parallel to itself and to the plane of the base sheet to scroll the upper sheet toward the joined edge portion to reveal the text on the base sheet.

7. A method according to claim 6 wherein the step of translating the curled opposite edge of the upper sheet comprises rapidly reciprocating said curled opposite edge parallel to itself and to the plane of the base sheet while reading at least a portion of the indicia on the upper sheet to alternately expose the corresponding portion of the indicia on the base sheet such that persistance of vision tends to merge the two portions of corresponding indicia.

8. A teaching aid for reinforcing a student's ability to learn symbolic indicia, the teaching aid comprising:
   a flexible opaque upper sheet (12) having legible symbolic indicia marked thereon in a predetermiend format;
   at least one opaque base sheet (11) disposed under and in contact with the upper sheet and having other indicia marked thereon, the other indicia representing a translation of the indicia marked on the upper sheet and being in substantial registry with the corresponding indicia on the upper sheet;
   means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and
   means (23) to facilitate lifting and lowering an edge portion of the upper sheet spaced from the joined edge portion quickly up and down to briefly expose the base sheet, wherein the symbolic indicia on the upper sheet constitute a running text of words in a language unfamiliar to the student, and the other indicia on the base sheet constitute a translation of said running text in a language familiar to the student, the words of the translation on the base sheet being in as close registry as possible with the words of the text on the upper sheet within the constraints of differences in syntax, grammar, direction of reading, and length between the text marked on the upper sheet and the text marked on the base sheet.

9. A teaching aid according to claim 8, the teaching aid further comprising:
a plurality of pairs of upper sheets and base sheets arranged in superposed sequence and bound in book form, and the running text continues from one upper sheet to the next.

10. A teaching aid for reinforcing a student's ability to learn symbolic indicia, the teaching aid comprising:
a flexible opaque upper sheet (12) having legible symbolic indicia marked thereon in a predetermined format;
at least one opaque base sheet (11) disposed under and in contact with the upper sheet and having other indicia marked thereon, the other indicia representing a translation of the indicia marked on the upper sheet and being in substantial registry with the corresponding indicia on the upper sheet;
means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and
means (23) to facilitate lifting and lowering an edge portion of the upper sheet spaced from the joined edge portion quickly up and down to briefly expose the base sheet, wherein said means for joining an edge of the upper sheet to a corresponding edge of the base sheet comprises an elongated channel-shaped plastic binding clamp (22) removably attached to the corresponding edges (17, 13) of said upper and base sheets.

11. A teaching aid for reinforcing a student's ability to learn symbolic indicia, the teaching aid comprising:
a flexible opaque upper sheet (12) having legible symbolic indicia marked thereon in a predetermined format;
at least one opaque base sheet (11) disposed under and in contact with the upper sheet and having other indicia marked thereon, the other indicia representing a translation of the indicia marked on the upper sheet and being in substantial registry with the corresponding indicia on the upper sheet;
means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and
means (23) to facilitate lifting and lowering an edge portion of the upper sheet spaced from the joined edge portion quickly up and down to briefly expose the base sheet, wherein said means for joining an edge of the upper sheet to a corresponding edge of the upper base sheet comprises a spiral binding (31) attached to the corresponding edges of said upper and base sheets.

12. A teaching aid for reinforcing a student's ability to learn symbolic indicia, the teaching aid comprising:
a flexible opaque upper sheet (12) having legible symbolic indicia marked thereon in a predetermined format;
at least one opaque base sheet (11) disposed under and in contact with the upper sheet and having other indicia marked thereon, the other indicia representing a translation of the indicia marked on the upper sheet and being in substantial registry with the corresponding indicia on the upper sheet;
means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and
means (23) to facilitate lifting and lowering an edge portion of the upper sheet spaced from the joined edge portion quickly up and down to briefly expose the base sheet, wherein said means to facilitate lifting the bottom edge of the upper sheet comprises an elongated channel-shaped plastic binding clamp (23) removably attached to the bottom edge of said upper sheet.

13. A teaching aid for reinforcing a student's ability to learn symbolic indicia, the teaching aid comprising:
a flexible opaque upper sheet (12) having legible symbolic indicia marked thereon in a predetermined format;
at least one opaque base sheet (11) disposed under and in contact with the upper sheet and having other indicia marked thereon, the other indicia representing a translation of the indicia marked on the upper sheet and being in substantial registry with the corresponding indicia on the upper sheet;
means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and
means (23) to facilitate lifting and lowering an edge portion of the upper sheet spaced from the joined edge portion quickly up and down to briefly expose the base sheet, wherein said means to facilitate lifting the bottom edge of the top sheet comprises means (23) extending outwardly from each side edge of the upper sheet at the bottom edge thereof.

14. A teaching aid for reinforcing a student's ability to learn symbolic indicia, the teaching aid comprising:
a flexible opaque upper sheet (12) having legible symbolic indicia marked thereon in a predetermined format;
at least one opaque base sheet (11) disposed under and in contact with the upper sheet and having other indicia marked thereon, the other indicia representing a translation of the indicia marked on the upper sheet and being in substantial registry with the corresponding indicia on the upper sheet;
means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and
means (23) to facilitate lifting and lowering an edge portion of the upper sheet spaced from the joined edge portion quickly up and down to briefly expose the base sheet, wherein said means to facilitate lifting the bottom edge of the upper sheet comprises a stiff rod-like member (23) attached along the bottom edge of the top sheet and having opposite ends extending outwardly beyond the respective side edges of the upper sheet.

15. A teaching aid for reinforcing a student's ability to learn symbolic indicia, the teaching aid comprising:

a flexible opaque upper sheet (12) having legible symbolic indicia marked thereon in a predetermined format;

at least one opaque base sheet (11) disposed under and in contact with the upper sheet and having other indicia marked thereon, the other indicia representing a translation of the indicia marked on the upper sheet and being in substantial registry with the corresponding indicia on the upper sheet;

means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and means (23) to facilitate lifting and lowering an edge portion of the upper sheet spaced from the joined edge portion quickly up and down to briefly expose the base sheet, wherein both the base sheet and the upper sheet have additional markings, the additional markings (21) on the upper sheet being identical to and in registry with the additional markings (21) on the base sheet for aiding orientation of the student's eye with respect to corresponding indicia on the base and upper sheet.

16. A teaching aid according to claim 15 wherein said additional markings comprise pictorial illustrations (21).

17. A teaching aid for reinforcing a student's ability to learn symbolic indicia, the teaching aid comprising:

a flexible opaque upper sheet (12) having legible symbolic indicia marked thereon in a predetermined format;

at least one opaque base sheet (11) disposed under and in contact with the upper sheet and having other indicia marked thereon, the other indicia representing a translation of the indicia marked on the upper sheet and being in substantial registry with the corresponding indicia on the upper sheet;

means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and means (23) to facilitate lifting and lowering an edge portion of the upper sheet spaced from the joined edge portion quickly up and down to briefly expose the base sheet, the teaching aid further comprising:

a plurality of pairs of upper sheets and base sheets arranged in superposed sequence; and means for joining a second edge portion of one base sheet to corresponding second edge portions of the other base sheets of the plurality of pairs of upper sheets and base sheets, the second edge portion of each base sheet being adjacent to the edge portion joined to the respective upper sheet of said pair.

18. A teaching aid for reinforcing a student's ability to learn symbolic indicia, the teaching aid comprising:

a flexible opaque upper sheet (12) having legible symbolic indicia marked thereon in a predetermined format;

at least one opaque base sheet (11) disposed under and in contact with the upper sheet and having other indicia marked thereon, the other indicia representing a translation of the indicia marked on the upper sheet and being in substantial registry with the corresponding indicia on the upper sheet;

means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and means (23) to facilitate lifting and lowering an edge portion of the upper sheet spaced from the joined edge portion quickly up and down to briefly expose the base sheet, wherein the at least one base sheet comprises:

a plurality of superposed base sheets (68), each base sheet having marked thereon indicia representing a translation of the indicia marked on the upper sheet and in substantially exact registry with the corresponding indicia on the uppermost sheet, and the translation on each base sheet being different from the translation marked on each other base sheet; and means (73) to facilitate lifting an edge portion spaced from the joined portion of each base sheet above the lowermost base sheet quickly up from the base sheet directly therebelow to reveal the indicia marked on the directly below base sheet.

19. A teaching aid for reinforcing a student's ability to learn symbolic indicia, the teaching aid comprising:

a flexible opaque upper sheet (12) having legible symbolic indicia marked thereon in a predetermined format;

at least one opaque base sheet (11) disposed under and in contact with the upper sheet and having other indicia marked thereon, the other indicia representing a translation of the indicia marked on the upper sheet and being in substantial registry with the corresponding indicia on the upper sheet;

means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and means (23) to facilitate lifting and lowering an edge portion of the upper sheet spaced from the joined edge portion quickly up and down to briefly expose the base sheet, wherein the upper sheet and the at least one base sheet are rectangular, each sheet having a top edge, right and left side edges, and a bottom edge, and wherein the upper and base sheets are attached along the top edge of each sheet.

20. A teaching aid for reinforcing a student's ability to learn symbolic indicia, the teaching aid comprising:

a flexible opaque upper sheet (12) having legible symbolic indicia marked thereon in a predetermined format;

at least one opaque base sheet (11) disposed under and in contact with the upper sheet and having other indicia marked thereon, the other indicia representing a translation of the indicia marked on the upper sheet and being in substantial registry with the corresponding indicia on the upper sheet;

means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and means (23) to facilitate lifting and lowering an edge portion of the upper sheet spaced from the joined edge portion quickly up and down to briefly expose the base sheet, wherein the symbolic indicia on the upper sheet comprise multiple groups of indicia represented words of a language and wherein corresponding groups of indicia on the upper and base sheets are color coded.

21. A teaching aid according to claim 20 wherein the color coding comprises printing a group of indicia on the upper sheet in the same color as the corresponding group of indicia on each other sheet, but in a different color from any color used to print groups of indicia adjacent to the first mentioned group.

22. A teaching aid according to claim 20 wherein the color coding comprises underlining a group of indicia on the upper sheet with the same color as the corresponding group of indicia on each other sheet, but with a different color from any color used to underline groups of indicia adjacent to said first mentioned group.

23. A teaching aid according to claim 22 wherein said means for lifting the edge of any base sheet above the lowermost base sheet comprises a plastic tab (73) attached to each base sheet above the lowest one.

24. A teaching aid according to claim 23 wherein each plastic tab is marked with symbolic indicia which identify the type of translation which is marked on the sheet below the sheet to which the tab is attached.

25. A teaching aid for reinforcing a student's ability to learn symbolic indicia, the teaching aid comprising:

a flexible opaque upper sheet (12) having legible symbolic indicia marked thereon in a predetermined format;

at least one opaque base sheet (11) disposed under and in contact with the upper sheet and having other indicia marked thereon, the other indicia representing a translation of the indicia marked on the upper sheet and being in substantial registry with the corresponding indicia on the upper sheet;

means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and means (23) to facilitate lifting and lowering an edge portion of the upper sheet spaced from the joined edge portion quickly up and down to briefly expose the base sheet, wherein the symbolic indicia on the upper sheet comprise multiple groups of indicia representing words of a language and wherein the multiple groups of indicia represent a plurality of different figures of speech, and the at least one base sheet comprises a plurality of base sheets, one base sheet having all examples of a first figure of speech color coded with a first color and at least another base sheet having all examples of a different figure of speech color coded with a different color.

26. A teaching aid according to claim 25 wherein the color coding comprises underlining the corresponding groups of indicia with a respective color.

27. A teaching aid for reinforcing a student's ability to learn symbolic indicia, the teaching aid comprising:

a flexible opaque upper sheet (12) having legible symbolic indicia marked thereon in a predetermined format;

at least one opaque base sheet (11) disposed under and in contact with the upper sheet and having other indicia marked thereon, the other indicia representing a translation of the indicia marked on the upper sheet and being in substantial registry with the corresponding indicia on the upper sheet;

means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and means (23) to facilitate lifting and lowering an edge portion of the upper sheet spaced from the joined edge portion quickly up and down to briefly expose the base sheet, wherein the indicia on the upper sheet comprise a text in an unfamiliar language being taught to the student and the base sheet contains a phonetic transliteration of the text of the unfamiliar language.

28. A teaching aid for reinforcing a student's ability to learn symbolic indicia, the teaching aid comprising:

a flexible opaque upper sheet (12) having legible symbolic indicia marked thereon in a predetermined format;

at least one opaque base sheet (11) disposed under and in contact with the upper sheet and having other indicia marked thereon, the other indicia representing a translation of the indicia marked on the upper sheet and being in substantial registry with the corresponding indicia on the upper sheet;

means (22) for joining an edge portion of the upper sheet to a corresponding edge portion of the base sheet so that the indicia on the upper sheet are superposed substantially congruently above the indicia on the base sheet but no part of the base sheet is visible through the upper sheet; and means (23) to facilitate lifting and lowering an edge portion of the upper sheet spaced from the joined edge portion quickly up and down to briefly expose the base sheet, wherein the symbolic indicia on the upper sheet comprise multiple groups of indicia representing words of a language, and the teaching aid further comprising a blank sheet no larger than the area marked with symbolic indicia and means for attaching an edge of said blank sheet to an edge of one of said upper sheet and said at least one base sheet for providing space for written exercises.

29. A teaching aid for reinforcing a student's ability to learn symbolic indicia, the teaching aid comprising:

a flexible opaque upper sheet (12) having legible symbolic indicia marked thereon in a predetermined format;

at least one opaque base sheet (11) disposed under and in contact with the upper sheet and having other indicia marked thereon, the other indicia representing a translation of the indicia marked ont he upper sheet and being in substantial registry with the corresponding indicia on the upper sheet;

means (22) for joining as edge portion of the upper sheet to a corresponding edge portion of the base sheet so that the indicia on the upper sheet are superposed substantially congruently above the indicia on the base sheet but no part of the base sheet is visible through the upper sheet; and means (23) to facilitate lifting and lowering an edge portion of the upper sheet spaced from the joined edge portion quickly up and down to briefly expose the base sheet, the teaching aid further comprising a fully opaque flap (77) having a size just sufficient to cover a preselected portion of the multiple groups of indicia and means for removably attaching said flap to one of said upper and said at least one base sheet so as to cover said preselected portion of the multiple groups of indicia to provide space for written exercises.

30. A teaching aid according to claim 29 wherein said means for removably attaching said flap comprises an adhesive material.

31. A teaching aid according to claim 29 wherein the exposed surface of said flap comprises a material from which hand-written entries can be erased, so that the flap can be reused.

* * * * *

UNITED STATES PATENT AND TRADEMARK OFFICE
CERTIFICATE OF CORRECTION

PATENT NO. : 4,734,036
DATED : 29 March 1988
INVENTOR(S) : Helene Kasha

It is certified that error appears in the above-identified patent and that said Letters Patent is hereby corrected as shown below:

| Column | Line | |
|---|---|---|
| 4 | 47 | Change "as" to --is--. |
| 6 | 27 | Change "uper" to --upper--. |
| 7 | 19 | Change "sheets" to --sheet--. |
| 7 | 41 | Change "untrimemd" to --untrimmed--. |
| 8 | 65 | Change "faciliatte" to --facilitate--. |
| 13 | 57 | Delete "upper". |
| 17 | 6 | Change "represented" to --representing--. |
| 18 | 58 | Change "ont he" to --on the--. |
| 18 | 61 | Change "as" to --an--. |

Title Page: In "References Cited", change the inventor's name of U.S. Patent No. 3,744,155 from "Demonet" to --De Monet--.

[76] Inventor: Change the address of the inventor, Helene Kasha, from "P.O. Box 5564, Hamden, Conn. 06518" to --84 Bayard Avenue, North Haven, CT 06473--.

Signed and Sealed this

Sixteenth Day of August, 1988

Attest:

DONALD J. QUIGG

Attesting Officer

Commissioner of Patents and Trademarks